US011663630B2

(12) United States Patent
Gadoury

(10) Patent No.: US 11,663,630 B2
(45) Date of Patent: May 30, 2023

(54) SYSTEM AND METHOD FOR CUSTOMIZING AUDIO ADVERTISEMENTS

(71) Applicant: TRITON DIGITAL CANADA INC., Montreal (CA)

(72) Inventor: Jean-Francois Gadoury, St-Lambert (CA)

(73) Assignee: TRITON DIGITAL CANADA INC., Montreal (CA)

( * ) Notice: Subject to any disclaimer, the term of this patent is extended or adjusted under 35 U.S.C. 154(b) by 673 days.

(21) Appl. No.: 14/759,985

(22) PCT Filed: Jan. 9, 2014

(86) PCT No.: PCT/CA2014/050010
§ 371 (c)(1),
(2) Date: Jul. 9, 2015

(87) PCT Pub. No.: WO2014/107807
PCT Pub. Date: Jul. 17, 2014

(65) Prior Publication Data
US 2015/0332341 A1    Nov. 19, 2015

Related U.S. Application Data

(60) Provisional application No. 61/750,523, filed on Jan. 9, 2013.

(51) Int. Cl.
*G06Q 30/0251*    (2023.01)
*H04L 65/611*    (2022.01)
(Continued)

(52) U.S. Cl.
CPC ..... *G06Q 30/0269* (2013.01); *G06Q 30/0251* (2013.01); *G06Q 30/0275* (2013.01);
(Continued)

(58) Field of Classification Search
CPC .......... G06Q 30/0269; G06Q 30/0251; G06Q 30/0275; H04H 60/06; H04H 60/73;
(Continued)

(56) References Cited

U.S. PATENT DOCUMENTS 5,848,397 A * 12/1998 Marsh .................. G06Q 10/107
705/14.61
5,996,022 A * 11/1999 Krueger .................... G06F 8/65
348/E5.105
(Continued)

OTHER PUBLICATIONS

Supplementary European Search Report of corresponding European application No. 14737846.
(Continued)

*Primary Examiner* — Mario C. Iosif
(74) *Attorney, Agent, or Firm* — Garlick & Markison; Edward J. Marshall

(57) ABSTRACT

A system and method for streaming customized audio is disclosed. The system and method allow for the selection of advertisements based on at least one feature of a listener and insertion of the selected advertisements into a customized digital audio stream subsequently transmitted to a particular listener. In a particular embodiment, the advertisement is provided as a text string which is converted into audio for insertion into customized digital audio stream.

31 Claims, 5 Drawing Sheets

(51) Int. Cl.
*H04L 67/568* (2022.01)
*G06Q 30/0273* (2023.01)
*H04H 60/06* (2008.01)
*H04H 60/73* (2008.01)
*H04H 20/82* (2008.01)
*H04H 20/10* (2008.01)
*H04H 60/07* (2008.01)
*H04H 60/46* (2008.01)
*H04H 60/45* (2008.01)

(52) U.S. Cl.
CPC .......... *H04H 20/103* (2013.01); *H04H 20/82* (2013.01); *H04H 60/06* (2013.01); *H04H 60/07* (2013.01); *H04H 60/45* (2013.01); *H04H 60/46* (2013.01); *H04H 60/73* (2013.01); *H04L 65/611* (2022.05); *H04L 67/568* (2022.05)

(58) Field of Classification Search
CPC ...... H04H 20/82; H04H 20/103; H04H 60/07; H04H 60/46; H04H 60/45; H04L 65/4076; H04L 67/2842
See application file for complete search history.

(56) References Cited

U.S. PATENT DOCUMENTS

| | | | | |
|---|---|---|---|---|
| 7,490,053 | B1* | 2/2009 | Emerson, III | G06Q 30/0264 705/14.61 |
| 8,468,271 | B1* | 6/2013 | Panwar | G06Q 30/0615 370/469 |
| 2002/0062393 | A1 | 5/2002 | Borger et al. | |
| 2003/0023973 | A1* | 1/2003 | Monson | H04N 21/458 705/14.69 |
| 2003/0149975 | A1* | 8/2003 | Eldering | H04N 21/812 725/34 |
| 2003/0221191 | A1* | 11/2003 | Khusheim | H04N 7/173 725/35 |
| 2005/0182675 | A1* | 8/2005 | Huettner | G06Q 30/0258 705/14.56 |
| 2007/0118425 | A1* | 5/2007 | Yruski | G06Q 30/0264 725/32 |
| 2008/0276267 | A1 | 11/2008 | Badt et al. | |
| 2009/0204243 | A1 | 8/2009 | Marwaha | |
| 2009/0204402 | A1 | 8/2009 | Marwaha et al. | |
| 2010/0036731 | A1* | 2/2010 | Vieri | G06Q 30/02 705/14.53 |
| 2010/0114716 | A1* | 5/2010 | Heilig | G06Q 30/08 705/14.71 |
| 2010/0138290 | A1* | 6/2010 | Zschocke | G06Q 30/0242 705/14.41 |
| 2011/0137723 | A1 | 6/2011 | Thoern | |
| 2011/0161153 | A1* | 6/2011 | Carvis | G06Q 10/10 705/14.25 |
| 2011/0258024 | A1 | 10/2011 | Prince | |
| 2012/0166289 | A1 | 6/2012 | Gadoury et al. | |
| 2012/0184202 | A1 | 7/2012 | Gadoury | |
| 2012/0315019 | A1* | 12/2012 | Zipperer | G11B 27/322 386/261 |
| 2013/0103501 | A1* | 4/2013 | Vieri | G06Q 10/107 705/14.58 |

OTHER PUBLICATIONS

International Search Report and Written Opinion of International Patent Application No. PCT/2014/050010.

* cited by examiner

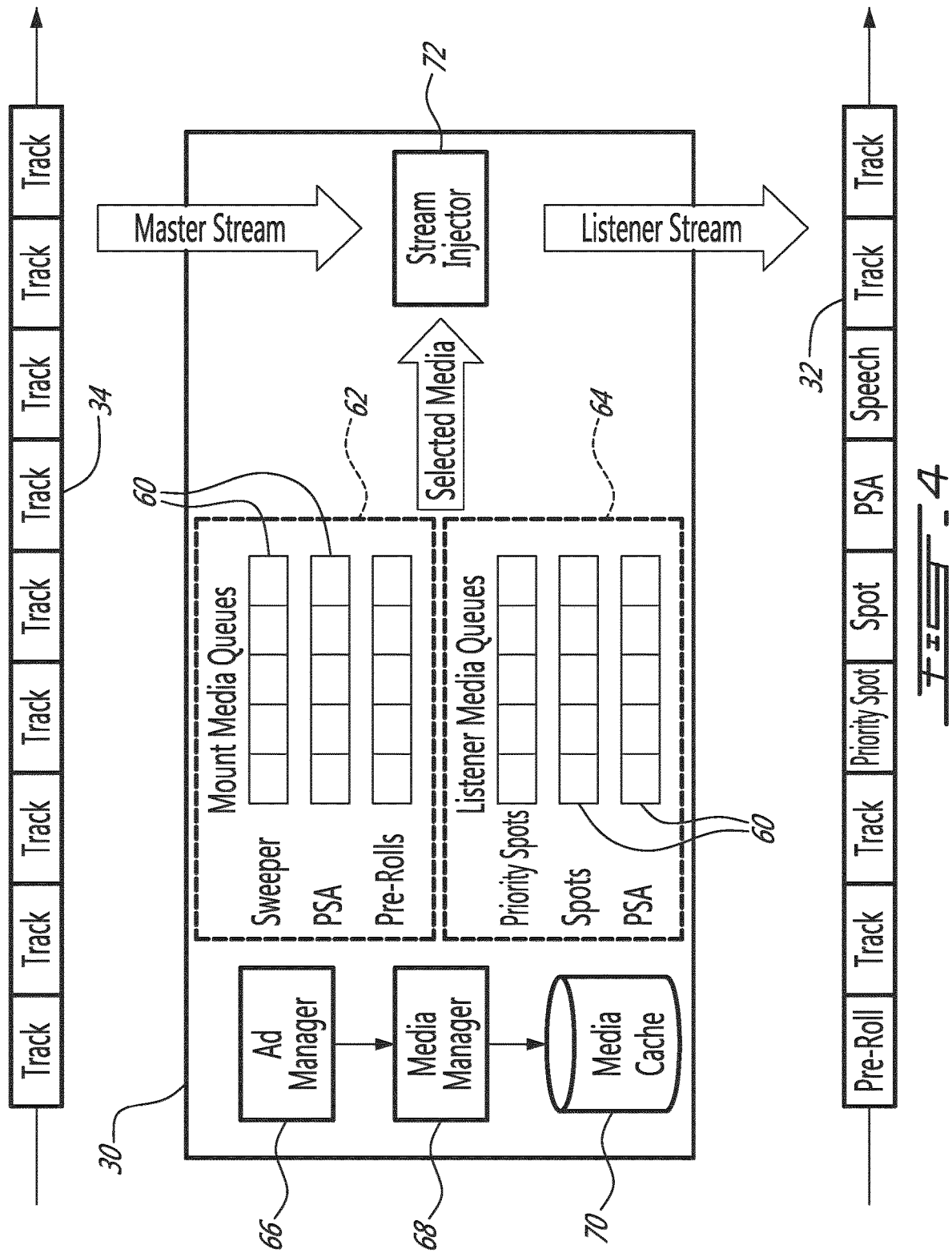

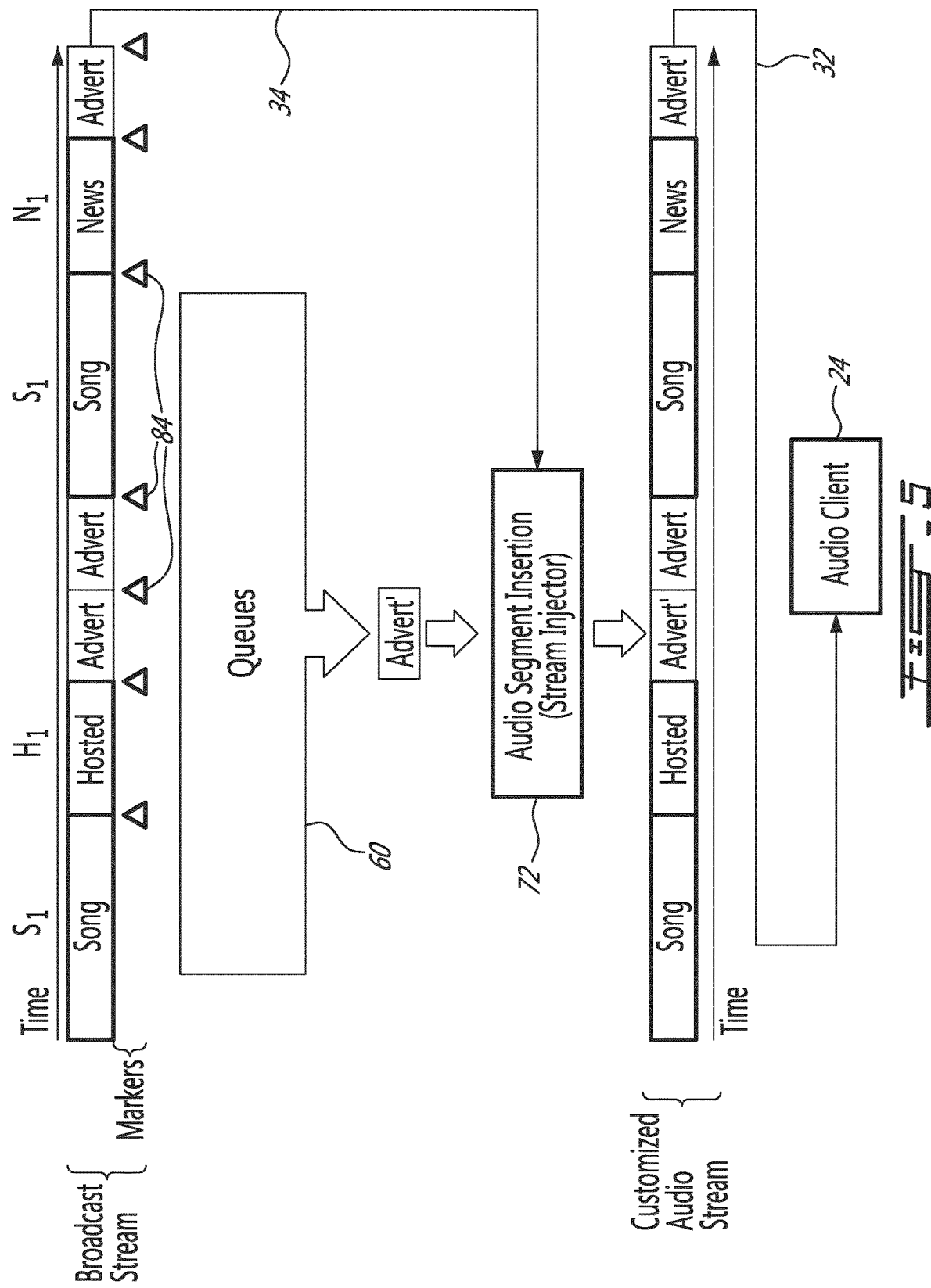

SYSTEM AND METHOD FOR CUSTOMIZING AUDIO ADVERTISEMENTS

CROSS-REFERENCE TO RELATED APPLICATIONS

This application is a National Entry Application of PCT application no PCT/CA2014/050010 filed on Jan. 9, 2014 and published in English under PCT Article 21(2), which claims benefit of U.S. provisional application Ser. No. 61/750,523 filed on Jan. 9, 2013. All documents above are incorporated herein in their entirety by reference.

FIELD OF THE INVENTION

The present invention relates to a system and method for customizing audio advertisements. In particular, the present invention relates to a system and method for customizing and inserting converted-to-audio text advertisements into streaming audio such as an online radio station.

BACKGROUND OF THE INVENTION

The prior art reveals digital online streaming audio systems which allow for the insertion of digitized audio advertising segments into digital broadcast radio streams in order to generate digital broadcast audio streams wherein the selection of advertisements are customized for a particular market or user. One drawback of such prior art systems is that, although the selection of advertisements is customized for a particular market or user, customization of the content of advertisements is not carried out.

The prior art also reveals systems which collect information on a listener's features, such as their browsing habits, use this information to generate demographic and other information, and then provide this information to potential advertisers such that they can develop marketing campaigns. In particular, the information is used to display particular advertisements to a user during web browsing based on selection of such demographic and other information thereby improving the chances that the advertisements reach an intended group of users. One drawback of such prior art systems is that advertisements are largely in text format and therefore suitable for display only on web pages.

SUMMARY OF THE INVENTION

In order to address the above and other drawbacks there is provided a system for customizing an audio broadcast and delivering a customized audio stream to a particular listener. The system comprises a listener client associated with the particular listener and comprising an audio stream decoder and an audio player, a broadcast audio stream in a digital format and divided into a plurality of segments therefrom at least one advertising segment, at least one advertisement selected from a source of advertisements based on at least one feature of the listener, a server for receiving the digital broadcast audio stream and the at least one advertisement, wherein the server customizes the digital audio stream by inserting each of the at least one advertisement into a respective one of the at least one advertising segments, the server subsequently streaming the customized digital audio stream to the listener client alone for playing to the particular listener.

There is also disclosed a method of customizing a plurality of broadcast audio streams with advertising from at least one advertiser, each of the streams for streaming to a particular one of a plurality of listener clients, the broadcast audio stream divided into a plurality of segments therefrom at least one advertising segment. The method comprises receiving a digital broadcast audio stream from a broadcaster, receiving an advertising text from the at least one advertiser for each of the listeners, each of the advertising text selected based on at least one feature of the respective listener, generating an audio advertisement from each of the selected advertising text, for each particular listener, inserting the selected audio advertisement into the at least one advertising segment and streaming the customized broadcast audio stream to the particular listener client.

Also, there is provided a server system for customizing an audio broadcast and delivering a customized audio stream to a plurality of listener clients each comprising an audio stream decoder and an audio player and associated with a particular one of a plurality of listeners. The system comprises a media relay for receiving a broadcast audio stream in a digital format and divided into a plurality of segments therefrom at least one advertising segment, a plurality of media gateways, each of the media gateways interconnected to a respective one of the listener clients, for each of the particular listeners, at least one audio advertisement selected based on at least one feature of the listener and an associated one of the plurality of media gateways, the associated media gateway customizing the digital broadcast audio stream by inserting the at least one audio advertisement into a respective one of the at least one advertising segments and subsequently streaming the customized digital audio stream to the listener client alone for playing to the particular listener.

Additionally, there is disclosed a system for customizing an audio broadcast and delivering a customized audio stream to each of a plurality of listeners. The system comprises a broadcast audio stream in a digital format and divided into a plurality of segments therefrom at least one advertising segment, for each listener, a listener client comprising an audio stream decoder and an audio player, for each listener, at least one advertisement selected from a source of advertisements based on at least one feature of the listener, a server for receiving the digital broadcast audio stream and the at least one advertisements, wherein for each particular listener the server customizes the digital audio stream by inserting each of the at least one advertisement into a respective one of the at least one advertising segments, the server subsequently streaming the customized digital audio stream to the listener client for playing to the particular listener.

BRIEF DESCRIPTION OF THE DRAWINGS

In the appended drawings:

FIG. 4 is a block diagram of the media gateway of the system of FIG. 1; and FIG. 5 provides a schematic diagram of a sequence of processing for a customized audio stream in accordance with an illustrative embodiment of the present invention.

DESCRIPTION OF ILLUSTRATIVE EMBODIMENTS

Figure 1:
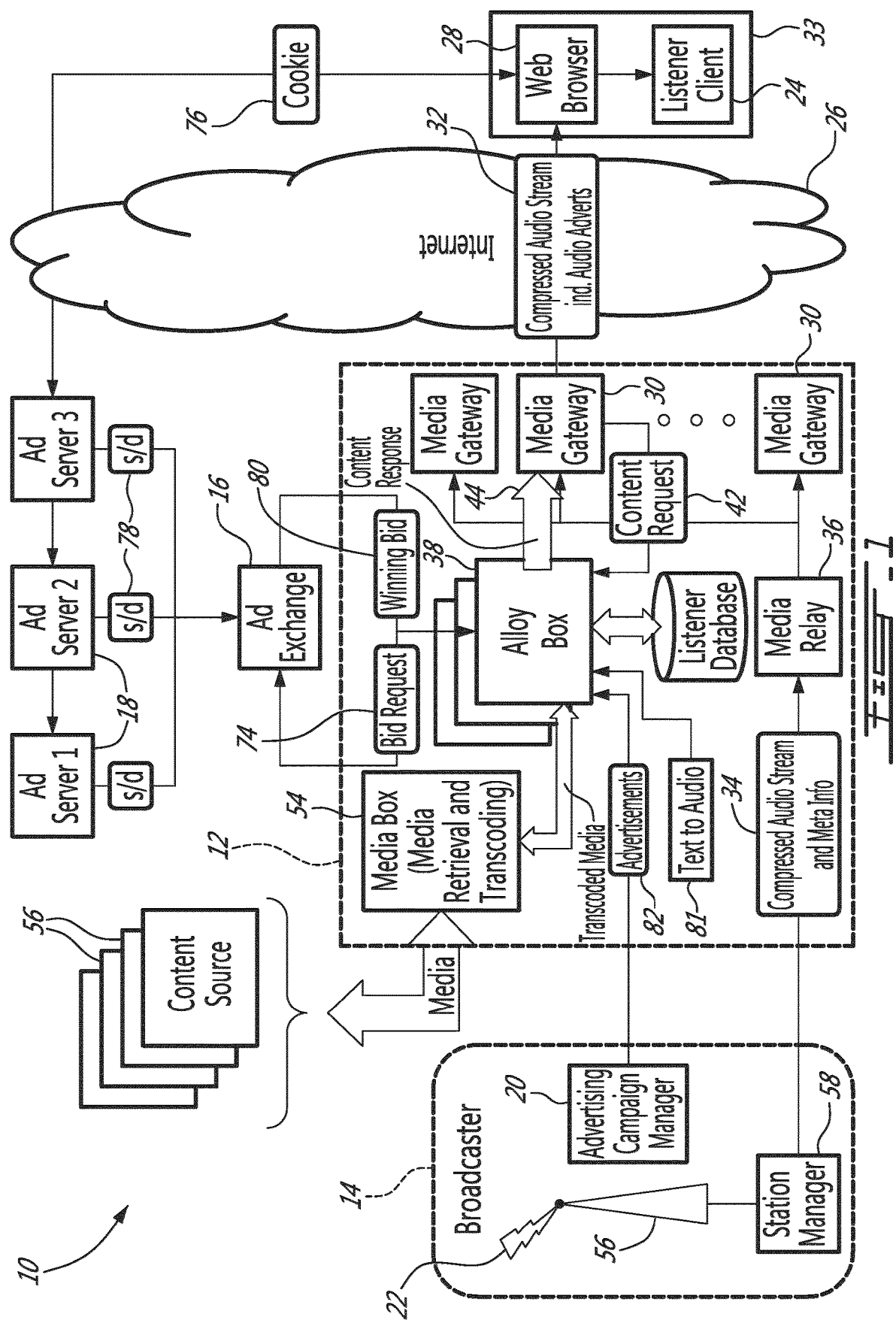
FIG. 1 is a block diagram of a system for customizing audio advertisements in accordance with an illustrative embodiment of the present invention.

Referring to FIG. 1, a system for customizing audio advertisements, generally referred to using the reference number 10 and in accordance with an illustrative embodiment of the present invention, will now be described. As will be discussed in detail below, the system 10 comprises a server side portion 12 which interacts with a broadcaster 14 and an ad exchange server 16 in order to provide ad servers as in 18 as well as a broadcaster's campaign manager 20 with customizable advertising access to broadcast audio streams as in 22 which are destined for transfer to a listener client as in 24, illustratively via a wide band network such as the Internet 26 and the listener's web browser 28 or smartphone or the like.

Figure 2:
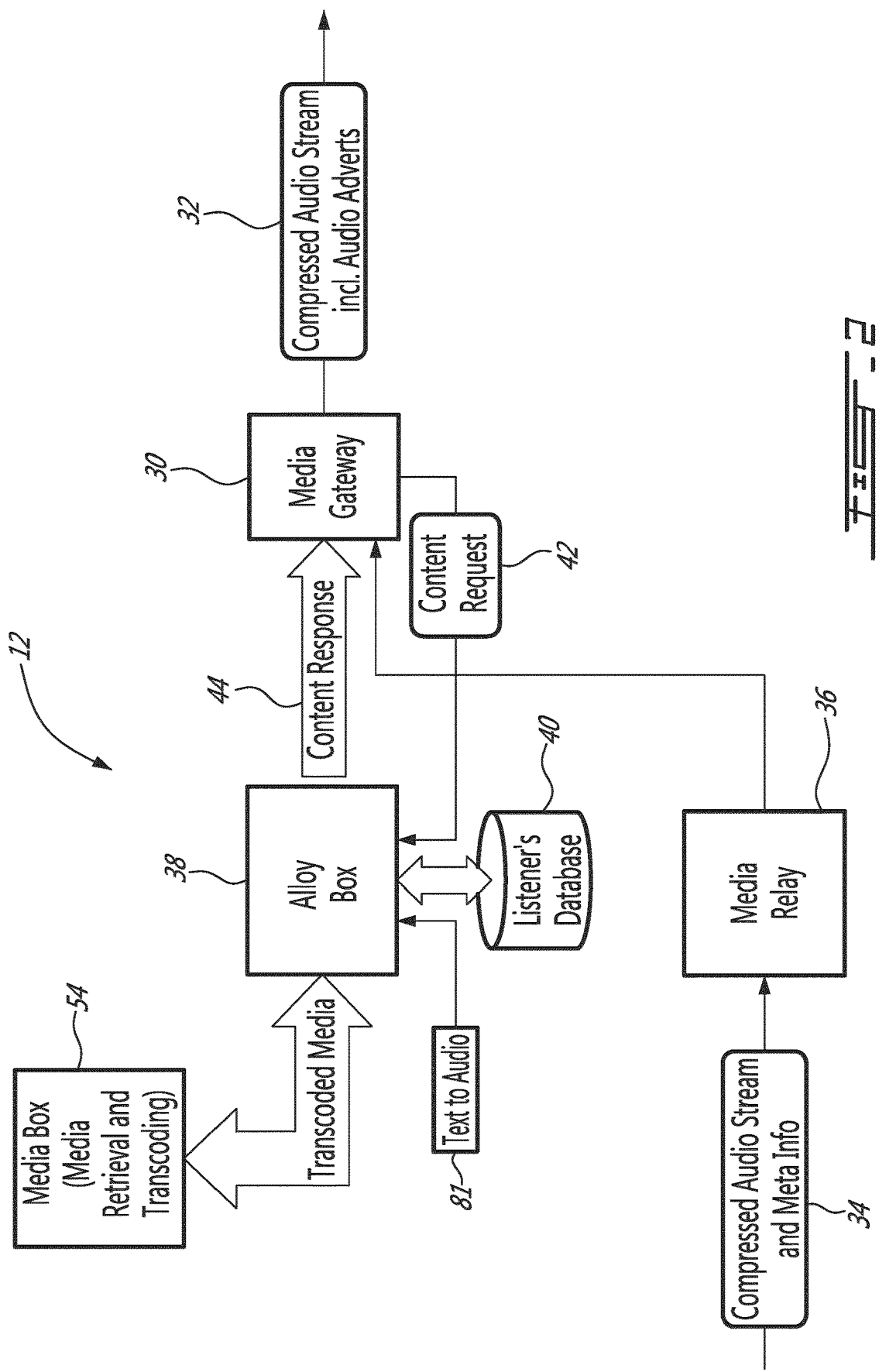
FIG. 2 is detailed block diagram of the server side system of the system of FIG. 1.

Referring to FIG. 2, the server side of the system 12 comprises a plurality of media gateways 30 which provide digital streaming audio as in 32 to the listener client 24 via the Internet 26. In order to successfully play the streaming audio 32 to the listener, the listener client 24 typically comprises an audio stream decoder, for example comprising one or more codecs which are compatible with a format of the digital streaming audio 32, and an audio player, attached for example to a speaker on the listener's media device 33, such as a tablet, smartphone, netbook, desktop PC or the like. The streaming audio 32 can comprise any type of conventional radio broadcast including music, news, sports and the like interspersed with commercial advertisements and intervals. Of note is that the streaming audio 32 is fully customizable as the media gateways 30 are able to prepare and transmit streams individually to each of the listeners, including into one of a plurality of different formats compatible with the listener's media device 33. The broadcast audio 34 is received by a media relay 36 which distributes the broadcast audio 34 to respective ones of the media gateways 30 for advertising insert and subsequent streaming to the particular listeners. The media relay 36 may also provide some reformatting of the broadcast audio 34 if required. As will be discussed in more detail below, the broadcast audio 34 typically includes meta data indicating locations within the broadcast audio 34 which are either empty or may be overwritten and therefore can be used for insertion of advertisements and the like.

Still referring to FIG. 2, a plurality of alloy boxes as in 38 are provided which support the media gateways as in 30 in providing customized advertisements for the listeners. When a listener connects to a stream via a media gateway as in 30, the media gateway 30 sends targeting information about the listener ("in band" information) to the alloy box 38. The alloy box 38 then creates or updates the listener's information as a listener profile in the listener database 40. The listener database 40 can comprise a local part and a global part which is used to share listener profiles or portions of listener profiles with other devices, such as alloy boxes, located elsewhere. The listener database 40 is also used to store a content history for each listener, in order to implement frequency caps and optionally impression (i.e. content/advertisement) logging.

Frequency caps are used to limit the frequency at which a particular content, identified for example using a unique content ID, is played back to the listener, for example limiting a specific advertisement to play back once every hour, or the like. In one embodiment frequency caps are interlocks between schedulable content items and a listener's content history. Different types of frequency caps are foreseen, for example:

Content—prevents duplicate scheduling of the same content item;
Campaign—prevents content from the same campaign being scheduled too close together;
Industry—prevents content from competing advertisers in the same industry being scheduled too close together; and
Advertiser—prevents content from a single advertiser from being scheduled too close together.

Frequency caps are typically associated with a single specific listener ID. Frequency caps may also include a time stamp indicating a time until which they are valid following which they will be removed from the content history.

The alloy box 38 logs impressions (e.g. playback of an advertisement) in the listener database 40. Impression reports are generated for all advertisements that are played to a particular listener. The impression reports contain the advertisement or content that was played and the time the impression occurred.

Content is requested by the media gateway 30 by illustratively transmitting a content request 42 to the alloy box 38, for example using an HTTP connection or the like. Content, such as an advertisement, is provided by the alloy box 38 to the media gateway 30 in a content response 44 and in the form of a media file which is suitable for injection into the media audio stream 32. Illustratively, the content is identified using a content ID which provides a reference to the media file. In a particular embodiment, a given content ID may reference one of a plurality of different formats of the same media file. Additionally, more than one content ID may reference the same media file.

Figure 3:
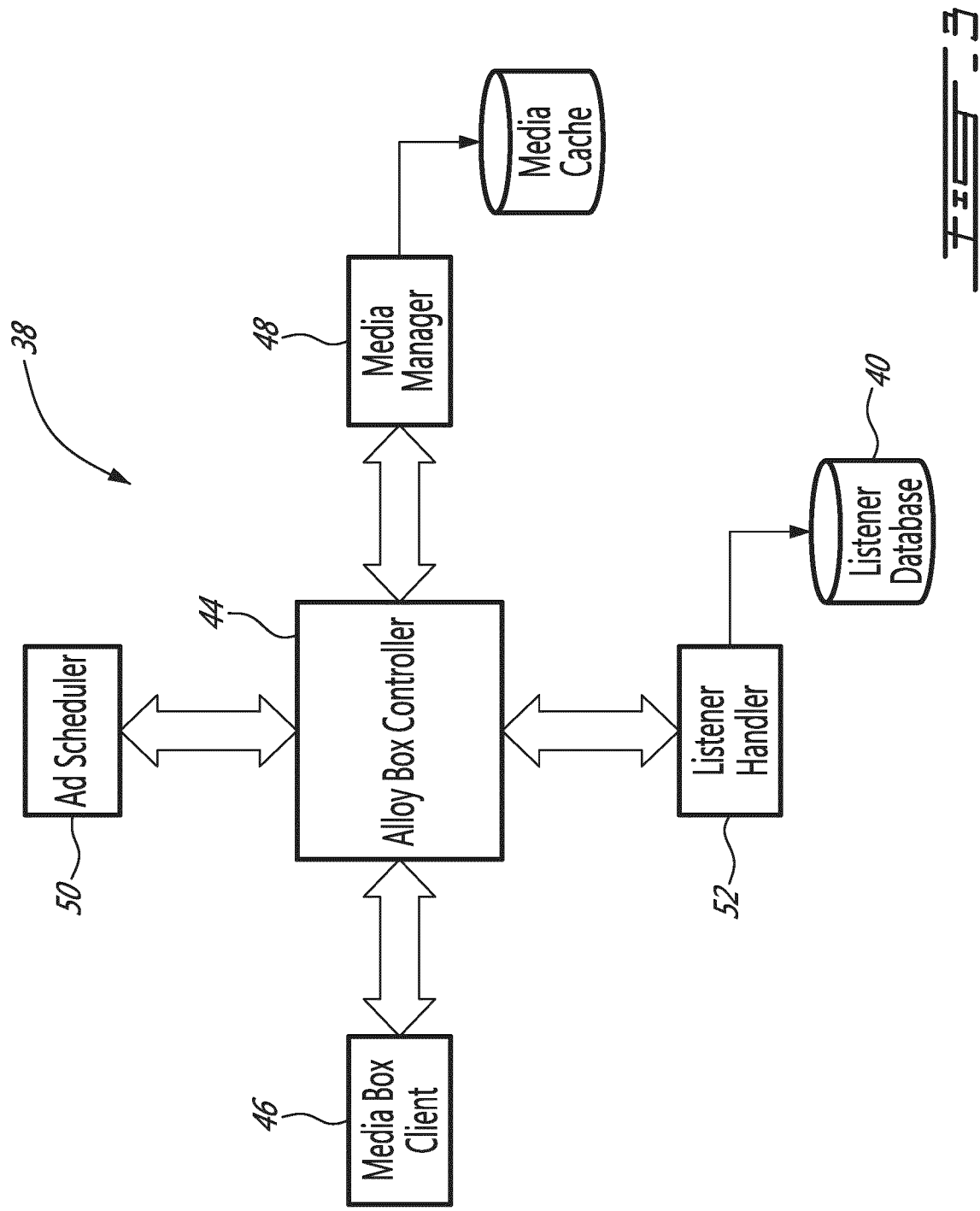
FIG. 3 is a block diagram of the alloy box of the system of FIG. 1.

Referring now to FIG. 3, the alloy box 38 comprises a controller 45 and illustratively serves as a caching proxy for all media files which are retrieved with the proper encoding from the media box via the media box client 46 and made available for injection when the retrieval is successful. Other features, such as cache cleanup and expiration are also provided by a media manager 48. The alloy box 38 also comprises an ad scheduler 50 which selects the best advertisements for a given listener, and given a series of rules including:

Schedule;
Target audience;
Frequency caps
Excluded items;
Optimization by dollar value;
Etc.

A listener handler 52 provides listener management for the alloy box 38. This includes:

Fetching listener information;
Fetching listener content history;
Updating listener information;
Updating listener content history (based on impression reports);
Listener database maintenance;
Etc.

This information can be retrieved, for example, as in band information from the listener during login, from a cookie installed on the media device 33 on which the listener client 24 is installed or from listener databases as in 40 located on other similar servers.

Additionally, when a listener disconnects from the media gateway 30 the alloy box 38 is notified.

Referring back to FIG. 1, under control of the alloy box 38, a media box 54 retrieves media files from one or more content sources 56 and transcodes the media files to the target stream format. Each alloy box 38 is able to access a media box 54, which comprises a bank of transcoders for retrieving and converting audio clips to one of a plurality different digital audio formats suitable for streaming and dependent on the format which is being used by the media gateway 30 to stream audio to the listener. This format is typically dictated by the capabilities of the listener's audio client 24. The media box 54 may also include a data store for storing media files.

Still referring to FIG. 1, as discussed above, a media gateway as in 30 which is streaming an audio broadcast to a listener receives a compressed audio stream of the broadcast 34 and illustratively meta data via the media relay 36 from a receiving apparatus such as an antenna 56 and station manager 58. In a particular embodiment the compressed audio stream of the broadcast 34 as well as some or all of the meta data may be received via a broadband network such as the Internet. Using the meta data, the media gateway 30 determines portions of the audio stream suitable for insertion of audio advertisements. A system for carrying out such insertion is described in US Patent Application published with No. 2012/0166289, which is incorporated in its entirety herein by reference.

Referring now to FIG. 4, the media gateway 30 comprises a plurality of queues 60, including a group of global queues 62 and a group of listener specific queues 64. Global queues 62 include sweeper, Public Service Announcement (PSA) and pre-roll queues and listener specific queues 64 include priority spot (or priority advertisement), spot (or normal advertisement) and PSA queues. As known in the art, a sweeper is a promotional item used by the provider of the broadcast (or customized) stream. Typically media from the listener specific queues is used before the global queues as the content of the listener specific queues is generally of greater value. The pre-roll queue is typically used at the commencement of streaming to a listener when the listener specific queues 64 are not yet ready for injection. In this regards, the global queues 62 are typically kept "topped up" to ensure the availability of fall back media. Each of the queues has a configurable low water mark, such that when the media held within the queue drops below this level, new media is acquired, for example by the ad manager 66 and/or media manager 68. The low water mark takes into account rate of consumption as well as latency in receiving new media in order to ensure that an empty queue is never encountered. The media manager 68 also manages a media cache 70 for storing media files whose entries form part of the media queues as in 60.

Referring back to FIG. 2 in addition to FIG. 4, in order to populate the queues as in 60 which are in turn used to populate portions of the audio stream identified as suitable for insertion of audio advertisements, the ad manager 66 requests audio advertisements 44 from its corresponding alloy box 38, illustratively using an HTTP request. The alloy box 38 is also provided with the format in which the advertisement should be provided back to the ad manager 30, for example as it is provided as part of the request 42, such that the advertisement can be readily injected into the audio stream. Additionally, as discussed above, the request 42 includes a coded identifier or other information such that the request can be associated with the listener 24 for which the requested advertisement is destined.

Still referring to FIG. 4, selected content such as advertisements, pre-rolls or the like is inserted into predetermined spots within the audio broadcast stream 34 by the stream injector 72, and illustratively in response to meta data transmitted with the broadcast stream 34, to form the streaming audio 32.

Referring back to FIG. 1, in an illustrative embodiment, when the alloy box 38 receives a request for an audio advertisement from the media gateway, the alloy box 38 transmits a bid request 74 to the ad exchange server 16. In one embodiment, the ad exchange server 16 enters into a bidding process with the plurality of ad servers as in 18 in order to fulfill the bid request 46. In this regard, the ad servers as in 18 sell "advertising inventory", i.e, those portions of the audio stream identified as suitable for insertion of audio advertisements, to advertisers in real-time and based on the value the advertisers ascribe to the particular listener. As such, the bid request 46 will typically include information regarding the audio broadcast being listened to and may include in band information collected directly from the listener 24. In band information can be anything sent by the listener's client application, typically at connection time, such as a unique listener's ID, device type, network address such as an IP address, HTTP headers, HTTP query parameters, HTTP cookies or geo-location information (which typically can be derived from the IP address).

In an alternative embodiment, the ad servers as in 18 are typically aware of certain features of the listener 24 through the use of a cookie 76, or the like which includes a coded identifier such that the listener 24 for which the advertisement is being bid on can be identified. The cookie 76 will typically provide access to "out of band" information including for example demographic information such as age, civil status, race, profession, sport, hobbies, mother tongue (language), gender and the like and other information either entered by the listener 24 and associated with the cookie, or derived from the listener's listening and browsing habits. Depending, for example, on the demographic data associated with the listener 24, each ad server as in 18 might provide a bid 78 for fulfilling the bid request 74. The ad exchange 16 illustratively selects the highest (or most valuable) bid as the winning bid 80.

Still referring to FIG. 1, the winning bid 80 illustratively includes, and as will be discussed in more detail below could include a text string representation of the advertisement including one or more wild card fields which can be customized using the attributes of the listener 24, such as listener's name and the like. Some sample text strings are provided following:

Hello $name$. I know you were looking for an iPhone, come back to greatdeals dot com and use the displayed code for 5% off.

Hello $name$. If you want a PS3, please visit our web site at greatdeals dot com.

Hello $name$. If you want a new flat screen TV, please visit our web site at greatdeals dot com.

In this regard, the alloy boxes as in 38 are able to access a text to audio converter 81 comprising an audio bank which stores a plurality of prerecorded audio clips or segments, illustratively in MP3 format, which can be used to fabricate customized audio advertisements. In this regard, on receiving the text string the alloy box would retrieve one or more audio clips corresponding to the text string and attributes of the listener which are used to fill any wild card fields.

Other aspects of the advertisement may also be customized by the winning bid 80. For example, a particular language, gender, accent (e.g. British, American) or voice (e.g. a prominent person) might be selected by the winning bid 80. These may also be selected as the listener as an attribute. Using the text string and sound clips from the audio bank of the text to audio converter 81, the alloy box 38 prepares an audio advertisement which fulfills the requirements of the winning bid 80. As necessary the alloy box 38 may transcode the prepared audio advertisement using the media box 54 such that it matches the encoding of the compressed audio stream 32 being streamed to the listener 24.

Alternatively, the winning bid 80 illustratively includes a link to an audio asset, such as an MP3 audio file stored, for example, in one of the content sources as in 56 or elsewhere on the Internet, which can be retrieved by the alloy box 38.

In still another embodiment, the alloy box 38 might receive advertisements 82 for insertion directly from the broadcaster's advertising campaign manager 20 which can be used to fulfill a request for audio advertisement 42. Again, the campaign manager 20 will typically have access to user information, for example out of band information via a cookie or the like, such that advertisements can be customized to the particular listener.

The prepared audio advertisement 44 is then provided to the media gateway 30 which requested the audio advertisement.

Referring now to FIG. 5 in addition to FIG. 1, as discussed above the media relay 36 provides a broadcast audio stream 34 to one or more of the media gateways 30 for transmission to the listener 24. The broadcast audio stream 34 illustratively comprises a plurality of different song segments $S_1 \ldots S_N$, hosted segments $H_1 \ldots H_N$, news segments $N_1 \ldots N_N$, advertisements segments, $A_1 \ldots A_N$, etc., whose start and end points are typically indicated by meta tags, or markers, as in 84. In this regard, the broadcast audio stream 34 is illustratively in an mpeg audio format or the like and the markers are coded into the mpeg audio stream, for example in appropriate control headers (not shown) or the like, or as meta data. Selected adverts are retrieved from the queues 60 and according to their relative priority and inserted by the stream injector 72 into an indicated spot within the broadcast audio stream 34. The resultant customized audio stream 32 is subsequently transmitted to the listener's audio client 24.

Although the present invention has been described hereinabove by way of non-restrictive illustrative embodiments and examples thereof, it should be noted that it will be apparent to persons skilled in the art that modifications may be made to the illustrative embodiments without departing from the spirit and the scope of the present invention.

The invention claimed is:

1. A system for customizing an audio broadcast and delivering a customized audio stream to each of a plurality of listeners, the system comprising:
   for each listener, a listener client comprising an audio stream decoder and an audio player;
   a broadcast audio stream in a digital format and divided into a plurality of segments therefrom at least one advertising segment;
   for each listener, a plurality of listener advertisements in said digital format and selected from a source of advertisements based on at least one feature of the listener, at least one listener advertisement of said plurality of listener advertisements including at least one customizable field;
   a server for receiving said broadcast audio stream and said at least one listener advertisement and comprising a plurality of media gateways, wherein:
      each of said listener clients is interconnected with a dedicated one of said media gateways;
      each of said media gateways includes a first group of global queues and a second group of listener specific queues;
      the first group of global queues includes a pre-roll queue storing pre-roll advertisements to be inserted in the event that advertisements in the second group of listener specific queues are not ready for insertion into the broadcast audio stream;
      the second group of listener specific queues stores listener advertisements; and
      each of the dedicated one of said media gateways configured to generate, for an interconnected listener client, a listener customized digital audio stream by:
         determining that a listener specific queue associated with the interconnected listener client is below a predetermined low water mark;
         retrieving at least one pre-roll advertisement from the pre-roll queue; and
         inserting said at least one pre-roll advertisement into the at least one advertising segment prior to retrieving content from a listener specific queue associated with at least one listener and inserting said content into a the at least one advertising segment, said dedicated media gateway subsequently streaming said listener customized digital audio stream to said listener client for decoding using said audio stream decoder and playback on said audio player.

2. The system of claim 1, wherein said source of advertisements is one of a plurality of online advertisers and further comprising an electronic advertisement exchange offering said at least one advertising segment to the plurality of online advertisers, the online advertisers bidding against one another for said at least one advertising segment and based on said at least one feature of the listener, wherein a winning bid of said online advertisers is awarded said at least one advertising segment and provides at least one advertisement to said server for insertion into said at least one advertising segment.

3. The system of claim 2, wherein said at least one feature of the listener is provided to the electronic advertisement exchange using at least one cookie registered on a media device of the listener and on which said listener client is installed.

4. The system of claim 1, wherein a source of the audio broadcast is a broadcaster and a source of at least one advertisement is an advertising campaign manager of the broadcaster, said advertising campaign manager selecting at least one selected advertisement of a plurality of advertisements based on said at least one feature of the listener and providing said at least one selected advertisement to said server for insertion into a respective one of said at least one advertising segment.

5. The system of claim 1, wherein said at least one advertisement comprises a text string and further wherein said server comprises a text to audio convertor for converting said text string into a digital audio clip.

6. The system of claim 1, wherein each of said listener clients is capable of receiving a digital audio stream in at least one of a plurality of different formats and further wherein said server is capable of converting said digital audio stream into each of said plurality of different formats.

7. The system of claim 1, wherein retrieving at least one feature of a particular listener from an electronic source of listener information comprises one of retrieving in band information provided by the listener during login, retrieving a cookie associated with the listener client and retrieving a data stored in a listener database.

8. The system of claim 1, wherein said at least one customizable field comprises a wildcard. and wherein said dedicated media gateway modifies said at least one listener advertisement by replacing said wild card with said at least one feature of a particular listener.

9. The system of claim 8, wherein said at least one feature comprises a name of the particular listener.

10. The system of claim 1, wherein said second group of listener specific queues comprises a high priority queue, said listener advertisements include a high priority advertisement.

11. A server system for customizing an audio broadcast and delivering a customized digital audio stream comprising listener personalized advertising to a plurality of listener clients comprising an audio stream decoder and an audio player and each of the listener clients associated with a particular listener of a plurality of listeners, the server system comprising:
a server comprising:
a media relay for receiving a broadcast audio stream in a digital format and divided into a plurality of segments therefrom at least one advertising segment; and
a plurality of media gateways, wherein:
each of said media gateways is remotely interconnected to a respective one of the listener clients;
each of said media gateways includes a first group of global queues and a second group of listener specific queues;
the first group of global queues includes a pre-roll queue storing pre-roll advertisements to be inserted in the event that advertisements in the second group of listener specific queues are not ready for insertion into the broadcast audio stream;
the second group of listener specific queues stores listener advertisements; and
each of the plurality of said media gateways configured to generate, for an interconnected listener client, the customized audio by:
determining that a listener specific queue associated with the interconnected listener client is below a predetermined low water mark;
retrieving at least one pre-roll advertisement from the pre-roll queue; and
inserting said at least one pre-roll advertisement into the at least one advertising segment prior to retrieving content from a listener specific queue associated with the interconnected listener client, and inserting said content into a respective one of said at least one advertising segments and subsequently streaming said customized digital audio stream to the interconnected listener client for playing to the particular listener.

12. The server system of claim 11, wherein the said broadcast audio stream comprises meta data indicating locations of said advertising segments within the broadcast audio stream.

13. The server system of claim 11, wherein the said advertising segments comprise one of locations within the broadcast audio stream which are empty, locations within the broadcast audio stream which comprise content but may be overwritten and combinations thereof.

14. The server system of claim 11, wherein said broadcast audio stream is in a format incompatible with the associated listener client and further wherein said server converts said broadcast audio stream into a format compatible with the associated listener client.

15. The server system of claim 11, wherein each of said media gateways comprises a queue for temporarily storing said listener advertisement, said listener advertisement removed from said queue on insertion into a respective one of said at least one advertising segments.

16. The server system of claim 11, wherein the audio broadcast comprises a conventional radio broadcast comprising one of music, news, sports, and combinations thereof and advertisements and further comprising a station manager for receiving the conventional radio broadcast and converting the conventional radio broadcast into said customized audio stream.

17. The server system of claim 11, wherein said at least one feature of the listener is selected from a group comprising a unique listener ID, a listener device type, a listener IP address, an HTTP header, an HTTP query parameter, an HTTP cookie, a listener browsing history, geo-location information, an age of the listener, a gender of the listener, a civil status of the listener, a location of the listener, a race of the listener, a profession of the listener, a sport of the listener, a language of the listener, a hobby of the listener and combinations thereof.

18. The server system of claim 11, wherein said at least one feature of the listener is known to said associated one of the plurality of listener clients and wherein said at least one feature of the listener is provided to said server by an associated listener client as in band data.

19. The server system of claim 11, wherein said server further comprises a listener database storing at least one feature of each of the listeners.

20. The server system of claim 11, further comprising a database for logging advertisements streamed to each of the listeners, wherein said logged advertisements are used to implement frequency caps.

21. The server system of claim 11, wherein said listener advertisement comprises a text string and further and further comprising a text to audio convertor for converting said text string into a digital audio clip.

22. The server system of claim 11, wherein said listener advertisement comprises a digital audio clip which is inserted into said advertising segment.

23. The server system of claim 11, further comprising a listener database and wherein prior to customizing said digital audio stream, a respective one of the listener client logs onto the server system and sends in band information about the particular listener to the server system wherein said in band information about each of the plurality of listeners is stored in said listener database.

24. The server system of claim 11, further comprising a listener handler and a listener database and further wherein said listener handler fetches listener information and updates said listener information in said listener database, wherein said listener information is one of retrieved from said listener client as in band information and retrieved from a cookie registered on a media device of the listener and on which said listener client is installed.

25. The server system of claim 11, further comprising a media box for retrieving additional content files from one or more content sources and comprising a bank of transcoders wherein, if required, said media box transcodes said additional content files using one of said transcoders to a format compatible with said customized audio stream, further comprising a controller which serves as a caching proxy for caching media files retrieved and transcoded by said media box to a format compatible with said customized audio stream and makes said retrieved and transcoded media files available to an associated media gateway.

26. The server system of claim 11, further comprising an ad scheduler applying at least one rule for selecting a best listener advertisement for the particular listener, wherein said at least one rule comprises one of a predetermined schedule, a target audience, a frequency cap, an excluded item, an optimization by dollar value and combinations thereof.

27. The server system of claim 11, wherein each of said media gateways is interconnected to a respective one of the listener clients via a broadband connection such as the Internet.

28. The system of claim 11, wherein retrieving at least one feature of the particular listener from an electronic source of listener information comprises one of retrieving in band information provided by the listener during login, retrieving a cookie associated with the listener client and retrieving a data stored in a listener database.

29. The system of claim 11, wherein at least one of said listener advertisements comprising at least one customizable field said at least one customizable field comprises a wildcard and wherein the media gateway interconnected to the listener client modifies at least one of said listener advertisements by replacing said wild card with said at least one feature of the listener.

30. The system of claim 29, wherein said at least one feature of the listener comprises a name of the particular listener.

31. The server system of claim 11, wherein said second group of listener specific queues comprises a high priority queue, said listener advertisements include a high priority advertisement.

\* \* \* \* \*